United States Patent
Shuman et al.

(10) Patent No.: US 9,077,785 B2
(45) Date of Patent: Jul. 7, 2015

(54) ORIGINATOR MOBILE DEVICE ASSISTED VOICE CALL TECHNOLOGY SELECTION

(71) Applicant: QUALCOMM Incorporated, San Diego, CA (US)

(72) Inventors: Mohammed Ataur R. Shuman, San Diego, CA (US); Amit Goel, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/761,593

(22) Filed: Feb. 7, 2013

(65) Prior Publication Data

US 2014/0219272 A1    Aug. 7, 2014

(51) Int. Cl.
| | |
|---|---|
| H04L 12/66 | (2006.01) |
| H04M 7/00 | (2006.01) |
| H04L 29/06 | (2006.01) |
| H04L 29/08 | (2006.01) |
| H04W 48/18 | (2009.01) |

(Continued)

(52) U.S. Cl.
CPC ........... *H04M 7/006* (2013.01); *H04L 65/1016* (2013.01); *H04L 67/24* (2013.01); *H04L 67/141* (2013.01); *H04L 65/1069* (2013.01); *H04L 65/1073* (2013.01); *H04W 48/18* (2013.01); *H04W 76/02* (2013.01); *H04W 88/06* (2013.01)

(58) Field of Classification Search
CPC ............... H04M 7/006; H04L 65/1016; H04L 65/1069; H04L 65/1073; H04L 67/24; H04L 67/141; H04W 48/18

USPC ......... 370/238, 352, 354, 355, 356, 401, 435, 370/465
See application file for complete search history.

(56) References Cited

U.S. PATENT DOCUMENTS 6,542,499 B1 *  4/2003  Murphy et al.  ................ 370/352
6,650,909 B1 * 11/2003  Naqvi et al.  .................. 455/560

(Continued)

FOREIGN PATENT DOCUMENTS

| DE | 102006057817 A1 | 6/2008 |
|---|---|---|
| WO | 2011124760 A1 | 10/2011 |
| WO | 2012110110 A1 | 8/2012 |

OTHER PUBLICATIONS

Kyungmin Kim et al., "A Seamless Voice Call Handover Scheme for Next Generation Cellular Network," Yonsei Univ., Proceedings of the 15th Asia-Pacific Conf. on Comm (APCC 2009)-186, 2009 pp. 782-785.

(Continued)

*Primary Examiner* — Kevin Mew
(74) *Attorney, Agent, or Firm* — The Marbury Law Group, PLLC

(57) ABSTRACT

A smart Voice Over LTE (VoLTE) application for allowing a wireless mobile device to select an appropriate access technology for establishing a voice call with a target mobile device, based on the capabilities of the target mobile device. Selection on the client side allows interoperability of a VoLTE wireless mobile device on a circuit switched network without requiring use of a gateway between the circuit switched and VoLTE networks. If the target mobile device is only configured for legacy circuit switched network calls, the wireless mobile device need not begin the call connection on the VoLTE network and instead may establish the call on the circuit switched network from the beginning.

56 Claims, 14 Drawing Sheets

(51) Int. Cl.
*H04W 76/02* (2009.01)
*H04W 88/06* (2009.01)

(56) References Cited

U.S. PATENT DOCUMENTS

| | | | |
|---|---|---|---|
| 6,868,080 B1* | 3/2005 | Umansky et al. | 370/354 |
| 6,980,643 B2* | 12/2005 | Chen et al. | 379/377 |
| 2003/0091024 A1* | 5/2003 | Stumer | 370/352 |
| 2007/0183394 A1* | 8/2007 | Khandelwal et al. | 370/352 |
| 2008/0298348 A1* | 12/2008 | Frame et al. | 370/352 |
| 2009/0080411 A1* | 3/2009 | Lyman | 370/352 |
| 2009/0086718 A1* | 4/2009 | Coppage et al. | 370/352 |
| 2009/0170557 A1* | 7/2009 | Chauhan et al. | 455/552.1 |
| 2009/0238169 A1* | 9/2009 | Dalrymple et al. | 370/352 |
| 2009/0268725 A1 | 10/2009 | Coppage | |
| 2010/0165948 A1 | 7/2010 | Ore et al. | |
| 2010/0211604 A1* | 8/2010 | Campbell et al. | 707/780 |
| 2011/0044321 A1* | 2/2011 | Rosenberg et al. | 370/352 |
| 2011/0096762 A1* | 4/2011 | Basart | 370/338 |
| 2011/0134838 A1* | 6/2011 | Russell et al. | 370/328 |
| 2011/0249624 A1 | 10/2011 | Ramachandran et al. | |
| 2012/0196581 A1* | 8/2012 | Papakipos et al. | 455/415 |
| 2012/0213152 A1 | 8/2012 | Hegarty et al. | |
| 2013/0216039 A1* | 8/2013 | Mairs | 379/265.13 |
| 2013/0308632 A1* | 11/2013 | Keller et al. | 370/352 |
| 2014/0023047 A1* | 1/2014 | Aue et al. | 370/336 |

OTHER PUBLICATIONS

International Search Report and Written Opinion—PCT/US2014/014855—ISA/EPO—Jun. 16, 2014.
Paisal V., "Seamless Voice Over LTE," Internet Multimedia Services Architecture and Application (IMSAA), 2010 IEEE 4TH International Conference on, IEEE, Dec. 15, 2010, pp. 1-5, XP031929636, DOI: 10.1109/IMSAA.2010.5729423 ISBNL 978-1-4244-7930-6 paragraph [III.]; figures 1-3.
V1 GSM Association: "GSM Association Non Confidential Official Document RCS 5.1: Services and Client Specification Rich Communication Suite 5.1 Advanced Communications Services and Client Specification Security Classification", Aug. 13, 2012, pp. 1-100, XP055122342, Retrieved from the Internet: URL: http://www.gsma.com/network2020/rcs/specs-and-product-docs/ [retrieved on Jun. 10, 2014] p. 59, paragraph 2.6.1—p. 83, paragraph 2.6.2; tables 17,23.

* cited by examiner

ORIGINATOR MOBILE DEVICE ASSISTED
VOICE CALL TECHNOLOGY SELECTION

BACKGROUND

Long Term Evolution (LTE) is a mobile network standard for wireless communication of high-speed data. The standard is developed by the 3GPP (3rd Generation Partnership Project) and is specified in its Release 8 document series. In contrast to the circuit-switched (CS) model of cellular network standards, LTE has been designed to support only packet-switched (PS) services. Voice over LTE (VoLTE) is a mobile network standard to support voice calls over the LTE network. VoLTE delivers voice service as data flows within the LTE data bearer, and therefore avoids dependency on the present 2G or 3G CS cellular networks. However, while VoLTE technology is being introduced, and for a long time thereafter, there will be the need to support voice calls between VoLTE mobile devices and legacy CS network mobile devices.

One mechanism to provide this interoperability on a VoLTE mobile device may be to initiate voice calls on the VoLTE network, and to route the call to a VoIP-to-CS interface if the called mobile device does not support VoLTE. However, this method increases the call setup latency significantly and causes the VoLTE mobile device to experience degradation of service.

SUMMARY

Systems, methods, and mobile devices of the various embodiments enable a VoIP capable mobile device to select an appropriate technology for placing a call to a target mobile device. Specifically, a VoIP mobile device may be configured to determine at the time of placing a call whether a mobile device being called is VoIP capable, initiate voice calls to mobile devices determined to be VoIP capable using a VoIP network, and to initiate voice calls using a CS network to those mobile devices that are determined not to have VoLTE capability. In particular, the VoIP network may be a VoLTE network, and the mobile device may be a VoLTE capable mobile device configured to determine whether the mobile device being called in VoLTE capable.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
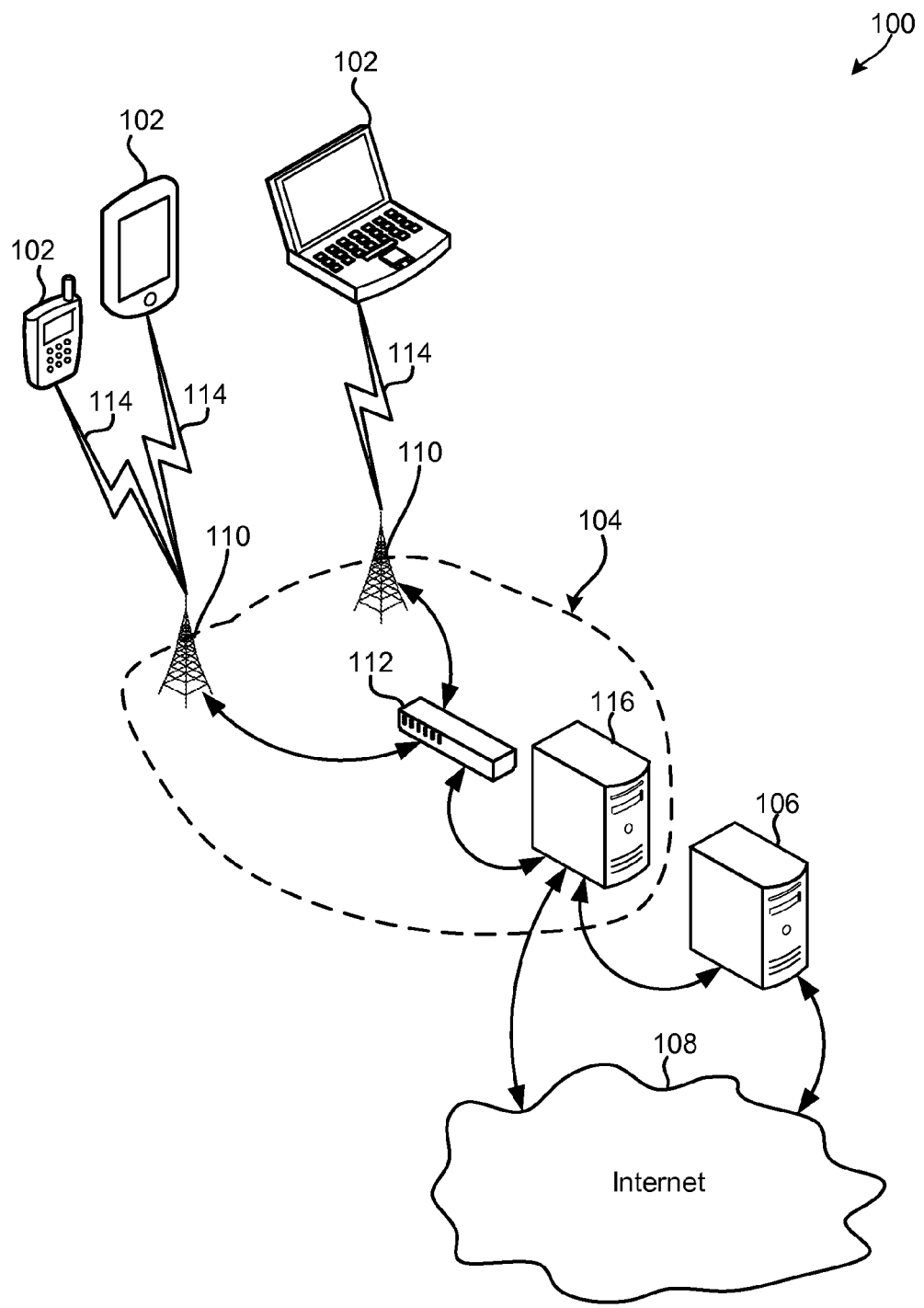
FIG. 1 is a communication system diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "wireless mobile device," "mobile mobile device," "wireless communications mobile device," "user equipment," and "mobile device" are used interchangeably to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic mobile devices which include a programmable processor and memory and circuitry for initiating and/or receiving voice calls over various networks.

As used herein, the terms "VoLTE-capable" "VoLTE mobile device," and "VoLTE client" are used interchangeably to refer to a wireless mobile device that is capable of making and receiving voice calls over a VoLTE network.

The Long Term Evolution (LTE) access solution is based on the evolution of the Universal Mobile Telecommunications System (UMTS) radio access through the Evolved UTRAN (E-UTRAN). LTE together with the Evolved Packet Core (EPC) network (core network accommodating LTE) make up an Evolved Packet System (EPS). While the access network in UMTS emulates a circuit switched connection for real time services and a packet switched connection for datacom services, the Evolved Packet System (EPS) is purely IP based, and both real time services and datacom services may be carried by the IP protocol.

LTE uses Orthogonal Frequency Division Multiple Access (OFDMA) technologies, and is an all-IP system that provides an end-to-end IP connection from the mobile equipment to the core network. Applications in LTE are supported by the IP Multimedia Subsystem (IMS), which is a standardized architectural framework for IP-based multimedia services.

LTE provides both quality of service and low latency features that are significant improvements over the services available on the 2G and 3G networks. However, the EPS network has been designed to exclusively use packet switched (PS) services, and has no circuit-switched domain. Thus, carrying voice traffic in LTE requires the use of voice over IP (VoIP) technologies, which is standardized in LTE systems by VoLTE.

VoLTE is an IMS-based specification that allows voice service to be integrated with the suite of applications that will become available on LTE. As wireless operators roll out VoLTE, support for legacy CS voice calls may be necessary to allow consumers to shift toward VoLTE-capable mobile devices. A proposed mechanism for providing this support includes a breakout gateway within the telecommunications network that functions to breakout calls from the VoLTE network and carry the calls over a legacy CS network if the called mobile device does not have VoLTE capability. However, this solution increases the call setup latency significantly, and the calling party would experience degradation of service. Another proposed mechanism is a circuit switched fallback in which LTE is only utilized for datagram communications, and a calling mobile device "falls back" to a legacy 2G or 3G network to place or receive a voice call. However, VoLTE-capable mobile devices would not be able to take advantage of the improved quality of service in LTE for voice calls, even for calls with other VoLTE-capable mobile devices.

The various embodiments provide methods for VoIP-capable wireless mobile devices placing voice calls over a VoIP network (e.g., a VoLTE network) or a CS network depending upon the capabilities of the mobile device being called. The embodiments allow VoIP-capable wireless mobile devices to be interoperable with CS networks without requiring use of a breakout gateway or other network-based solution. By proactively placing calls over a network with which the called mobile device can communicate, the embodiments avoid any delays in call set up that would be required by network-based solutions while maintaining quality of service for voice calls. The various embodiments are applicable to any VoIP-capable wireless mobile device, of which VoLTE-capable mobile devices is an example. Since the functionality of the various embodiments is essentially the same whether the mobile device is VoLTE-capable or capable of VoIP using a different network technology, VoLTE-capable mobile devices and VoLTE networks are used as exemplary embodiments in the following descriptions of the embodiments. However, the following references to VoLTE are not intended to limit the scope of the claims to the VoLTE technology unless specifically recited in the claims.

In an embodiment, a VoLTE-capable mobile device may select VoIP technology (for example, VoLTE) or traditional CS technology for placing a call to a target mobile device, based on the capabilities of the target mobile device. The embodiment methods allow for gradual adoption of VoLTE-capable mobile devices by customers, given that VoLTE capable mobile devices may frequently need to communicate with mobile devices that only support legacy CS network calls. By providing selection of an appropriate radio access technology on the client side instead of at the network, call latency may be reduced from eliminating the messaging required between network and mobile device.

The various embodiments may be implemented within a variety of communication systems, such as the example communication system 100 illustrated in FIG. 1. The communication system 100 may include one or more mobile devices 102, a telephone network 104, and network servers 106 coupled to the telephone network 104 and to the Internet 108. In an embodiment, the network server 106 may be implemented as a server within the network infrastructure of the telephone network 104.

A typical telephone network 104 includes a plurality of cell base stations 110 coupled to a network operations center 112, which operates to connect voice and data calls between mobile devices 102 (e.g., tablets, laptops, cellular phones, etc.) and other network destinations, such as via telephone land lines (e.g., a POTS network, not shown) and the Internet 108. The telephone network 104 may also include one or more servers 116 coupled to or within the network operations center 112 that provide a connection to the Internet 108 and/or to the network servers 106. Communications between the mobile devices 102 and the telephone network 104 may be accomplished via two-way wireless communication links 114, such as GSM, UMTS, EDGE, 4G, 3G, CDMA, TDMA, LTE, and/or other communication technologies.

Figure 2:
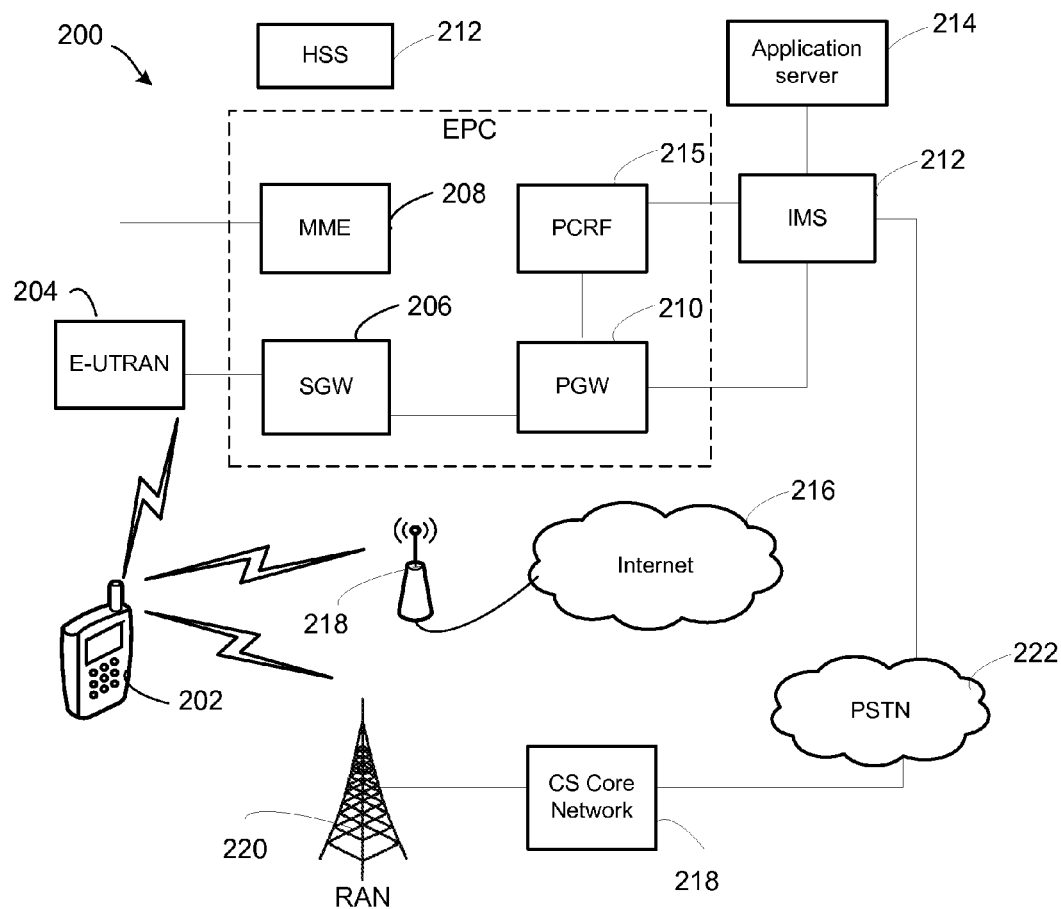
FIG. 2 is a communication system diagram of example voice service networks suitable for use with the various embodiments.

FIG. 2 illustrates components of the Evolved Packet System (EPS) network 200. In EPS network 200, a wireless mobile device 202 may be connected to a LTE access network, E-UTRAN 204. In the various embodiments, the E-UTRAN 204 may be a network of LTE base stations, eNodeBs.

E-UTRAN 204 may connect to the Evolved Packet Core by connecting to the Serving Gateway 205 by an interface to the Serving Gateway (SGW) 206 and to a Mobility Management Entity (MME) 208. The MME 208, which may also be logically connected to SGW 206, may handle tracking and paging of the wireless mobile device 200 and security for E-UTRAN access on the EPC 205. The MME 208 may be linked to a Home Subscriber Server (HSS) 212, which may support a database containing user subscription, profile, and authentication information.

The SGW 206 may route incoming and outgoing IP packets for the wireless mobile device via the LTE access network and external IP networks (i.e., packet data networks (PDNs)). The SGW 206 may also provide an anchor point for handover between eNodeBs. The SGW 206 may be logically connected to the PGW 210, which may route packets to and from PDNs to form a connection between the EPC and various PDNs, for example, the IP Multimedia Subsystem (IMS) 212. IMS 210 may connect with one or more application servers 214 to execute IMS specific services. The PGW 208 may be logically connected to a Policy Charging and Rules Function (PCRF) 215, a software component of the EPC that may enforce minimum quality of service parameters, and manage and control data sessions. PGW 208 may also provide connections with other public or private networks on the Internet 216.

In the various embodiments, in addition to the LTE access network, a wireless mobile device 202 may be configured to independently connect to various access networks that provide at least voice services through the public switched telephone network (PSTN) 218. In particular, the wireless mobile device 202 may connect to a legacy CS core network 218 through a radio access network 220 that provides at least voice service through the public switched telephone network (PSTN) 218. Wireless mobile devices 202 may further connect to other IP based networks, such as a WLAN 222, over a separate connection via an LTE system (e.g., access point 224).

Figure 3:
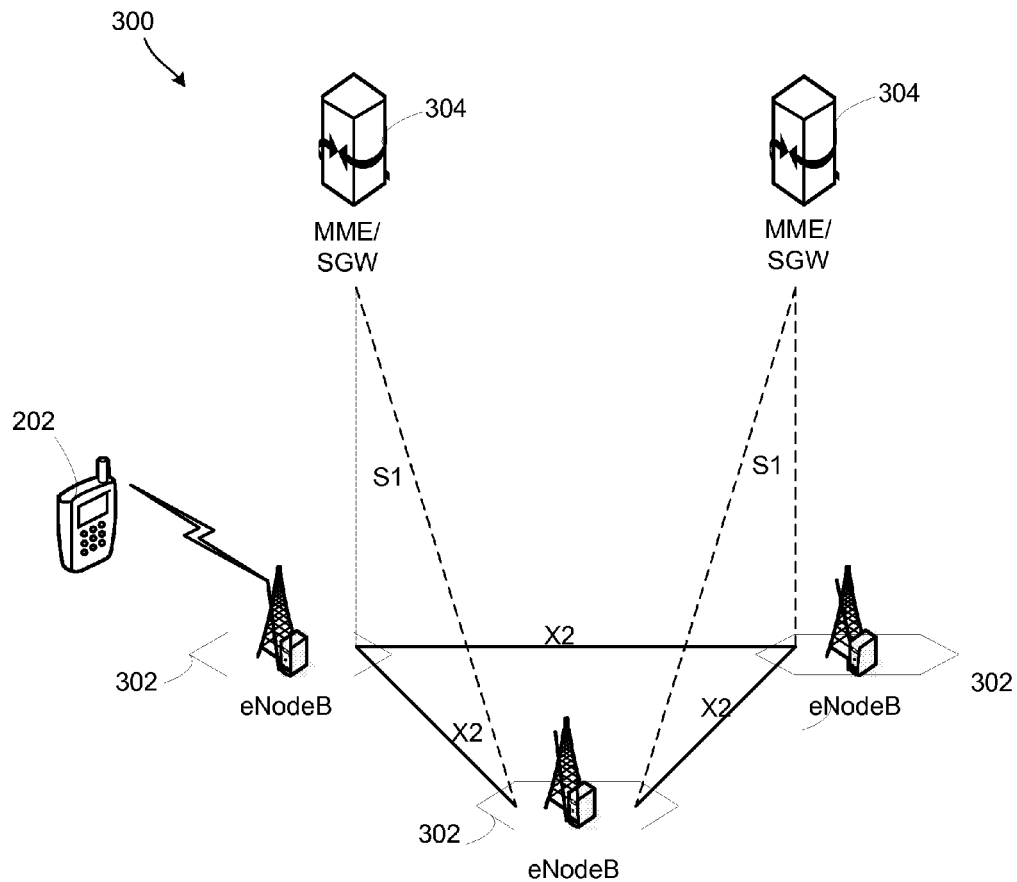
FIG. 3 is a communication system diagram of a VoLTE access network suitable for use with the various embodiments.

FIG. 3 illustrates components of a LTE access network, such as the E-UTRAN 204 described above with reference to FIG. 2. In an embodiment, the LTE access network may be a "flat architecture" composed of a plurality of base stations, such as eNodeBs 302. In contrast to 3G access networks, there is no centralized intelligent controller for an eNodeB 302. Instead, eNodeB's 302 may directly connect to components in the EPC, such as an MME 208 and an SGW 206 by an S1 interface.

ENodeBs 302 may be interconnected by an X2 interface. Thus, information may be distributed among the eNodeB's 302 in an E-UTRAN 204, thereby reducing connection set-up time and the time required for handovers. The X2 interface may be established between one eNodeB 302 and some of its neighbor eNodeB's 302 in order to exchange signaling information, in particular, interference-related information and handover-related information.

Figure 4:
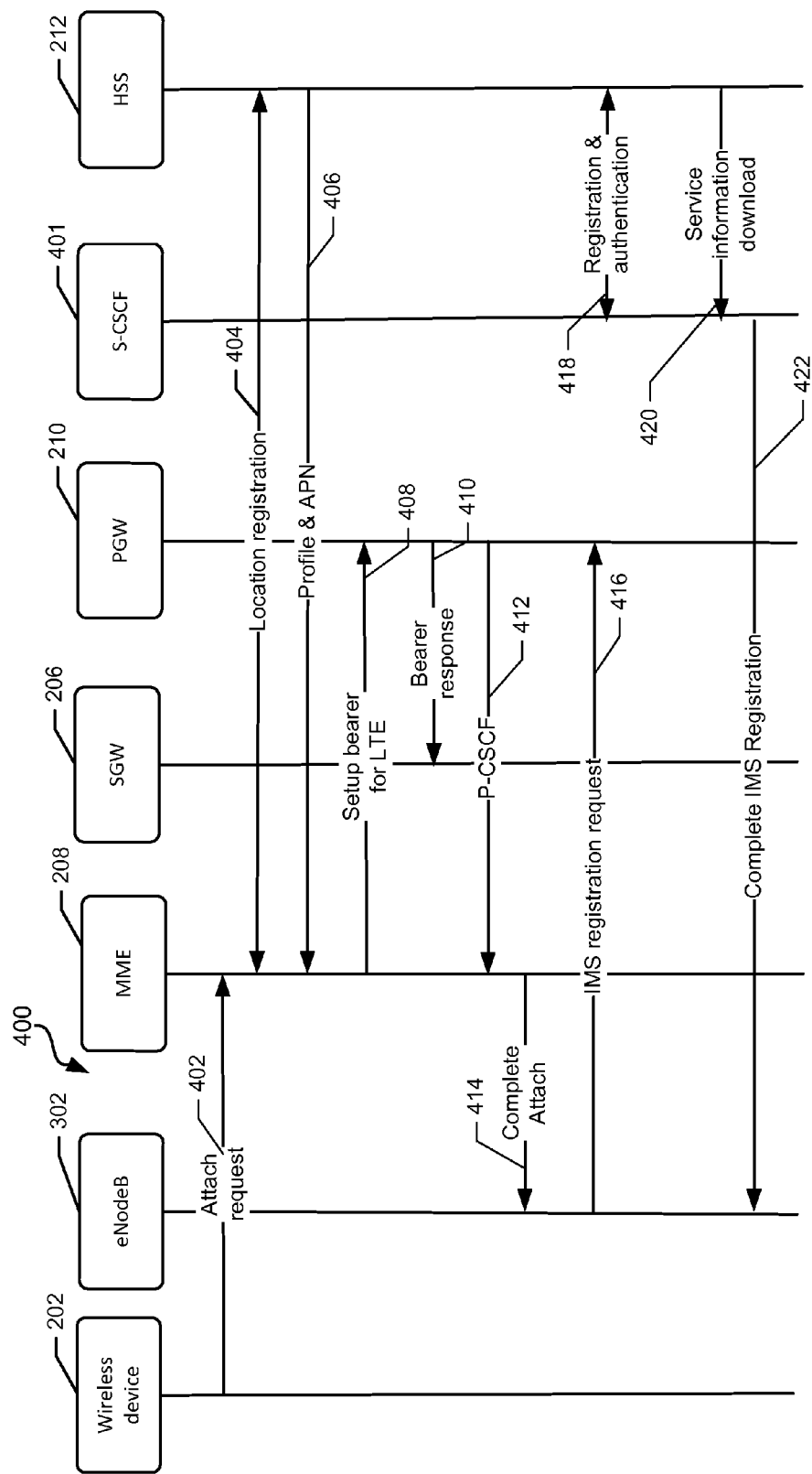
FIG. 4 is a message flow diagram illustrating example interactions between a wireless mobile device and EPS components to register the wireless mobile device on a VoLTE network.

FIG. 4 illustrates message flows diagram in a VoLTE setup procedure for a wireless mobile device 202 on the EPS 200 described above with reference to FIG. 2. In an embodiment, a wireless mobile device 202 may transmit an Attach request message to a MME 208, message 402. The MME may exchange information with the HSS to perform location registration, message 404. The MME 208 may download the subscriber profile containing the access point name (APN) for VoLTE service, message 406. Based on the VoLTE APN, the MME 208 may determine a destination PGW 210, and may transmit a request to the destination PGW to setup a bearer with the SGW 206, message 408. The PGW 210 may setup a bearer with the SGW 20, message 410. The PGW 210 may also allocate an IP address to the wireless mobile device 202, and determine the address of the Proxy Call/Session Control Function (P-CSCF) to which the wireless mobile device 202 may connect. The PGW 210 may transmit the P-CSCF address to the MME 208 via the SGW 206, message 412. The MME 208 in turn may transmit the P-CSCF address to the wireless mobile device 202 in an Attach Completion message 414.

The wireless mobile device may transmit an IMS registration request to the IMS core over the P-CSCF, message 416. The Serving Call/Session Control Function (S-CSCF) may perform registration and authentication procedures with the HSS, message 418. Upon authentication of the wireless mobile device, the S-CSCF) may download and store the service control information of the user from the HSS, message 420. The S-CSCF may notify the wireless mobile device that registration is complete, message 422, thereby completing IMS registration.

In the various embodiments, a VoLTE-capable wireless mobile device may select how to place a voice call based on the capabilities of the called mobile device. Specifically, a VoLTE-capable wireless mobile device may access information stored within the mobile device (which may be developed by the device or accessed from the network) to determine the network capabilities of a mobile device about to be called ("target mobile device"), and place a voice call to the target mobile device on a VoLTE network or on a legacy CS network based upon the determination made in the calling mobile device. By providing a selection procedure prior to call placement, as opposed to connecting to the LTE network for all calls, the calling mobile device is to avoid the network complications that would result from calling a CS-capable target mobile device via a VoLTE network.

In an embodiment, a VoLTE-capable wireless mobile device may be configured to run a VoLTE application in the background, referred to herein as a "Friend Finder" application, that may exchange information with a VoLTE application server. The Friend Finder application may require VoLTE clients to post information to a VoLTE application server, creating a user profile that may be shared with mobile devices to allow VoLTE mobile devices to determine whether a target mobile device has VoLTE capability.

Figure 5:
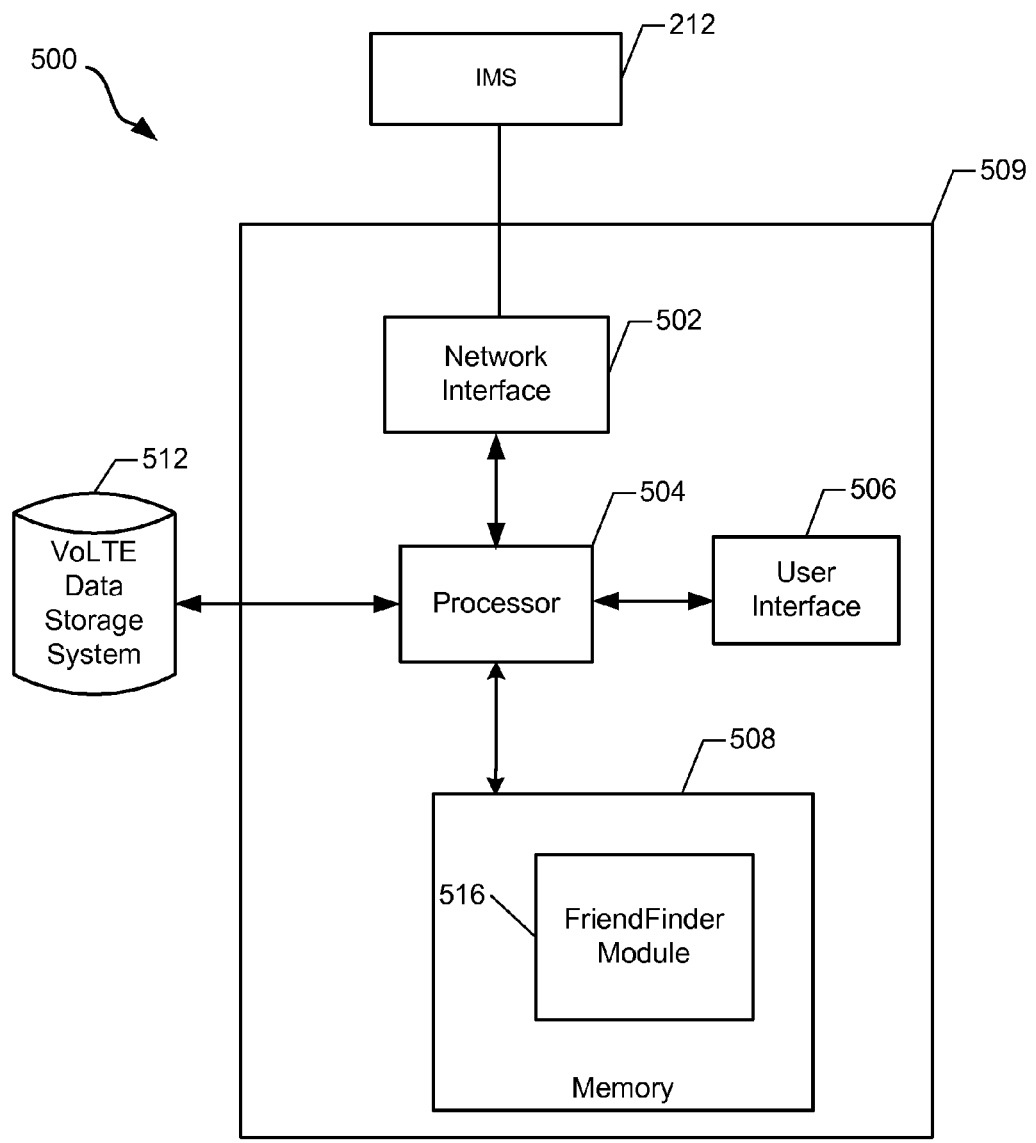
FIG. 5 is a component block diagram of a VoLTE application server suitable for use with the various embodiments.

FIG. 5 illustrates components of an embodiment VoLTE application server for managing information and supporting operations of the Friend Finder application. The application server 500 may include a network interface 502 that may be wired and/or wireless for communicating over the IMS 212. A processor 504 may be connected to the network interface 502, a user interface 506, and memory 508. The processor 504 may include one or more microprocessors, microcontrollers, and/or digital signal processors that provide processing functions, as well as other calculation and control functionality. The processor 504 may access memory 508 for reading/writing data and/or software instructions for executing programmed functionality. The memory 508 may be onboard the processor 504 (e.g., within the same IC package 509), and/or the memory may be external memory to the processor and functionally coupled over a data bus.

A number of software modules and/or data tables may reside in the memory 508 and be utilized by the processor 504, including but not limited to a Friend Finder application management module 510. The application server 500 may be further configured to receive and store user VoLTE information in a data storage system 512. The data storage system 512 may be an external repository that is connected via a wired or wireless network to the processor 504 of the application server 500.

Figure 6:
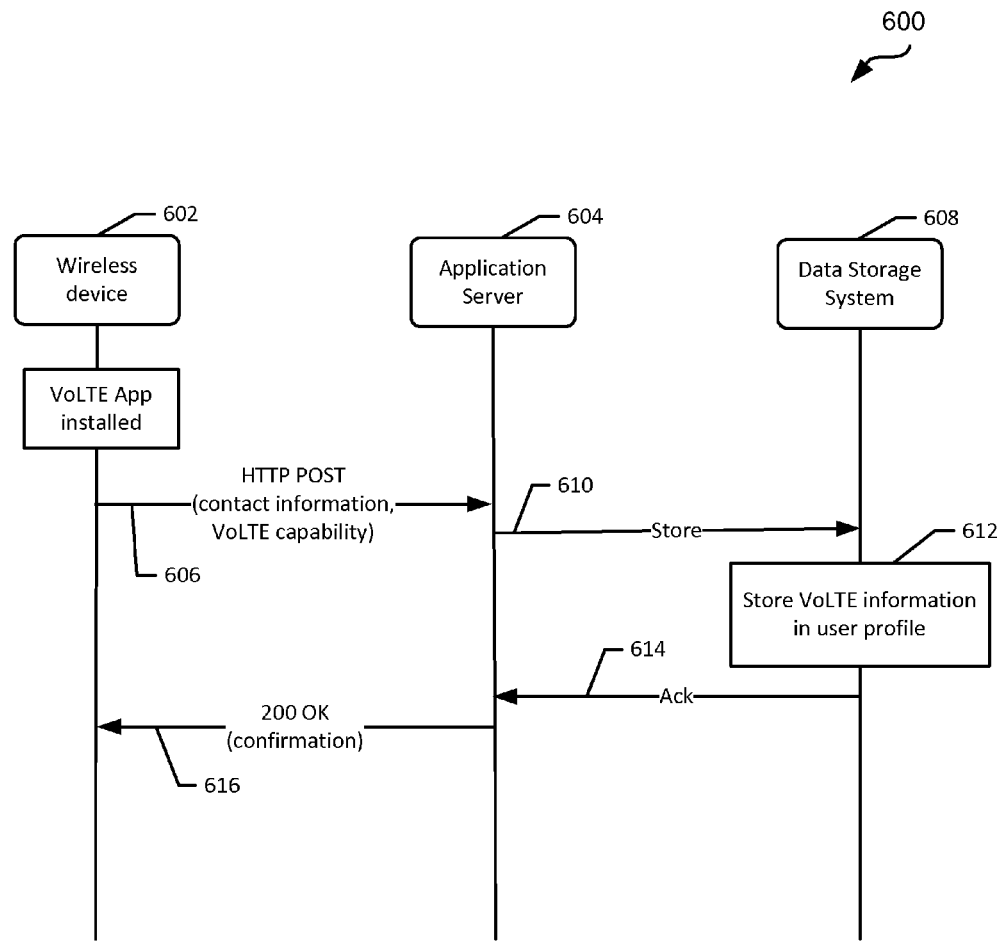
FIG. 6 is a message flow diagram illustrating example interactions between a wireless mobile device and a VoLTE application server for creating a VoLTE user profile.

FIG. 6 illustrates message flows 600 associated with the registration of a user profile for a VoLTE-capable wireless mobile device on the VoLTE network. A VoLTE-capable wireless mobile device 602 may initially verify the installation of the Friend Finder Application, and may send VoLTE registration information to a VoLTE application server 604, messages 606. Such information may include, but is not limited to, contact information, authentication/authorization information, specifics regarding VoLTE capabilities, etc. The message 606 may be sent, for example, using a Hypertext Transfer Protocol (HTTP) POST request. In turn, the VoLTE application server 604 may transmit the information to the Data Storage System 608 with an instruction to store the information, message 610. The information associated with wireless mobile device 602 may be stored by the data storage system 608 in a user profile associated with the wireless mobile device 602. The data storage system 608 may send an acknowledgment message 614 to the application server 604, which may transmit a confirmation status to the wireless mobile device 602 to indicate that the HTTP request was successful, message 616. Message 616 may be, for example, a 200 OK response. By registering with the VoLTE application server, the VoLTE capability of wireless mobile device 602 may be made available to other VoLTE-capable mobile devices through the Friend Finder application, ensuring that mobile terminating calls from other VoLTE clients will be attempted on the LTE network when possible.

Figure 7:
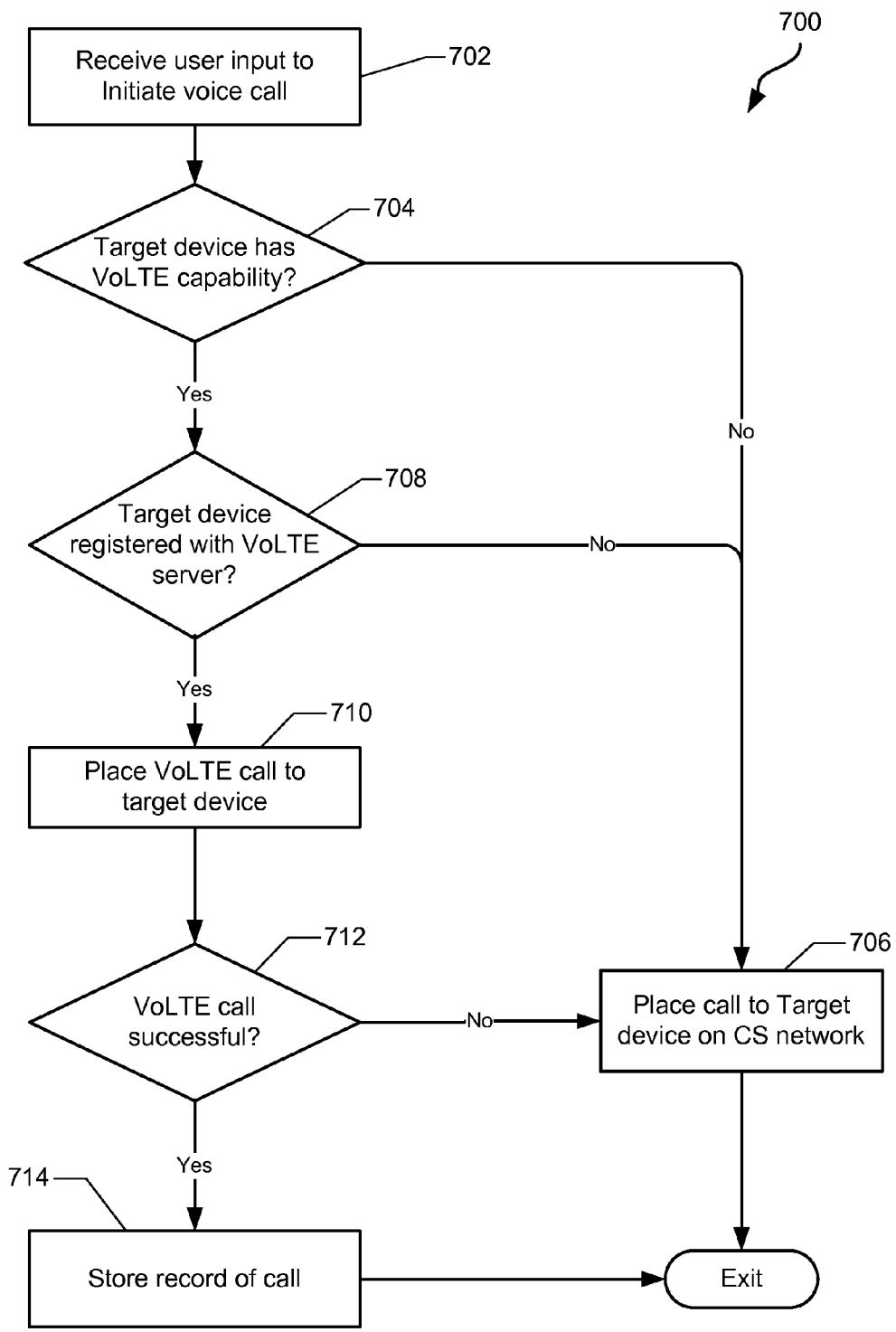
FIG. 7 is a process flow diagram illustrating an embodiment method for selecting a communication network to place a voice call to a target mobile device.

FIG. 7 illustrates an embodiment method 700 for placing a voice call to a target mobile device (e.g., wireless mobile device 602). In block 702, a VoLTE-capable wireless mobile device, such as wireless mobile device 602 as described above with reference to FIG. 6, may receive user inputs to initiate a mobile originating (MO) voice call to a target mobile device. In determination block 704, a processor of the wireless mobile device may determine whether the target mobile device has VoLTE capability. This determination is discussed further detail below with respect to FIG. 8.

If the mobile device processor determines that the target mobile device does not have VoLTE capability (i.e., determination block 704="No"), the mobile device may place the call to the target mobile device over a legacy CS network to which it may connect, in block 706. If the mobile device processor determines that the target mobile device has VoLTE capability (i.e., determination block 704="Yes"), in optional determination block 708, the mobile device processor may optionally determine whether the target mobile device can presently receive VoLTE calls by determining whether the target mobile device is registered with the VoLTE server. If the mobile device processor determines that the target mobile device is not registered with the VoLTE server (i.e., optional determination block 708="No"), the mobile device may place the call to the target mobile device over a legacy CS network to which it may connect, in block 706. If the mobile device processor determines that the target mobile device is registered with the VoLTE server (i.e., optional determination block 708="Yes"), the mobile device may place the call to the target mobile device on the LTE network in block 710. In another embodiment, optional determination block 708 may be skipped such that if the mobile device processor determines that the target mobile device does have VoLTE capability (i.e., determination block 704="Yes"), the mobile device may attempt to place the call over the LTE network without first determining such network's availability on the target mobile device.

In determination block 712, the mobile device processor may determine whether a VoLTE call placed to the target mobile device was successfully established. If the mobile device processor determines that the VoLTE call was successful (i.e., determination block 712="Yes"), the mobile device may exit the call initiation method 700. If the mobile device processor determines that the VoLTE call was not successful (i.e., determination block 712="No"), the mobile device may terminate further attempts to establish a VoLTE call, and instead may immediately re-initiate the call to the target mobile device using a legacy CS network. If the mobile device processor determines that the VoLTE call was successful (i.e., determination block 712="Yes"), the mobile device may store a record of the successful VoLTE call with the target mobile device, including identifying information of the target mobile device and VoLTE network, in block 714. This record of a successful VoLTE call may be used by the mobile device processor in the future to determine that the target mobile device is VoLTE capable and/or reachable via a VoLTE network.

Even though the target mobile device may be a VoLTE-capable mobile device and may be registered with the VoLTE server, a call over the VoLTE network may fail for various reasons, such as if the target mobile device is out of range of eNodeB's in the LTE access network or "roaming" with a connection to a CS network. By storing records of successful VoLTE calls, including the called mobile device MDN and an identification of the VoLTE network over which the call was placed (or at least attempted), the mobile device processor can place future calls by selecting a network to use to call the target mobile device that may reduce the call setup time since it may avoid repeating attempts to establish a connection on a VoLTE network when such connections are likely to fail.

In the various embodiments, the determination of whether a target mobile device has VoLTE capability, such as in determination block 704 described above with reference to FIG. 7, may be based on user profile information for VoLTE-capable mobile devices stored by the VoLTE application server that can be downloaded to the memory of the mobile device. As discussed above, VoLTE clients may register contact and network capabilities information with the VoLTE application server. The originating mobile device may execute a VoLTE application, such as a Friend Finder application, that connects with an eNodeB in order to access the VoLTE application server and retrieve mobile device VoLTE capability information from stored registration records.

Figure 8:
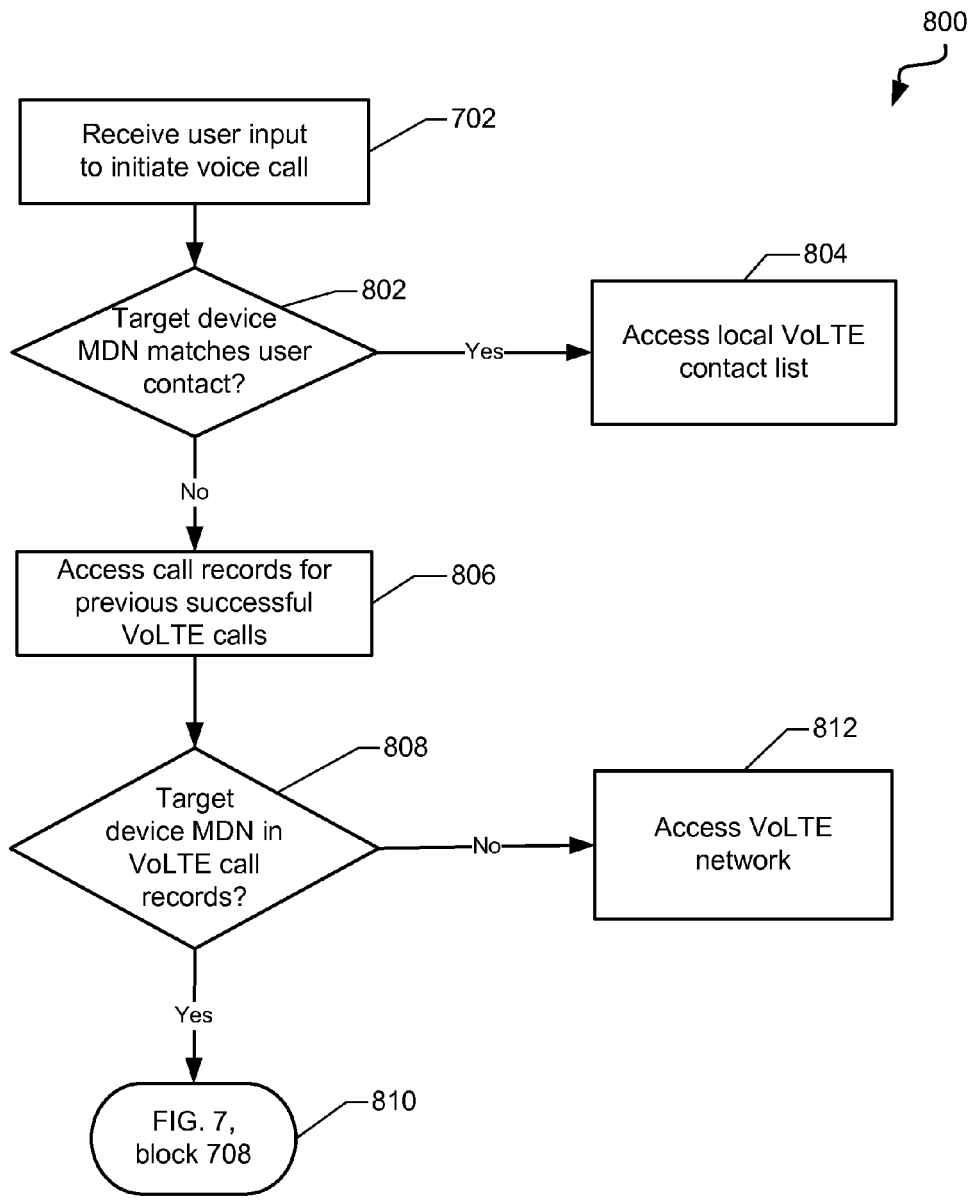
FIG. 8 is a process flow diagram illustrating an embodiment method for determining whether a target mobile device has VoLTE capability.

While delay time may be minimal, in the various embodiments a wireless mobile device may avoid the need to retrieve this information from the VoLTE network for every mobile originating voice call requested by the user. Specifically, the wireless mobile device may store certain VoLTE capability information locally to further shortcut the determination process, as illustrated in FIG. 8. Method 800 may be initiated upon receiving user input to place a call to the target mobile device in block 702 of method 700 described above with reference to FIG. 7. In determination block 802, the mobile device processor may determine whether the target mobile device's mobile device number (MDN) matches a user contact phone number. If the mobile device processor determines that the target mobile device MDN matches a user contact number (i.e., determination block 802="Yes"), in block 804 the mobile device may use a local VoLTE contact list, discussed in detail below with reference to FIG. 8, to determine whether the target mobile device has VoLTE capability. In block 810, the mobile device processor may return to block 704 in method 700 described above with reference to FIG. 7.

If the mobile device processor determines that the target mobile device MDN does not match a user contact number (i.e., determination block 804="No"), the mobile device processor may access its call records to determining whether there have been previous successful calls to the target mobile device over a VoLTE network in block 806. For example, after successful participation in a MO or MT voice call on a VoLTE network, the mobile device processor may store in local memory the phone number of the other party to that call. In this manner, even if the other party is not saved in the user's contacts database, the mobile device processor may determine that the number corresponds to a VoLTE-capable client.

In determination block 808, the mobile device processor may determine whether the target mobile device MDN is in the call records of previously successful VoLTE calls. If the mobile device processor determines that the target mobile device MDN is in the successful VoLTE call records, (e.g., determination block 808="Yes"), the mobile device processor may return to block 708 of method 700 described above with reference to FIG. 7. If the mobile device processor determines that the target mobile device MDN is not in the successful VoLTE call records, (e.g., determination block 808="No"), in block 812 the mobile device processor may access the VoLTE network to retrieve information about the target mobile device, as discussed in further detail below with reference to FIG. 9B.

Figure 9A:
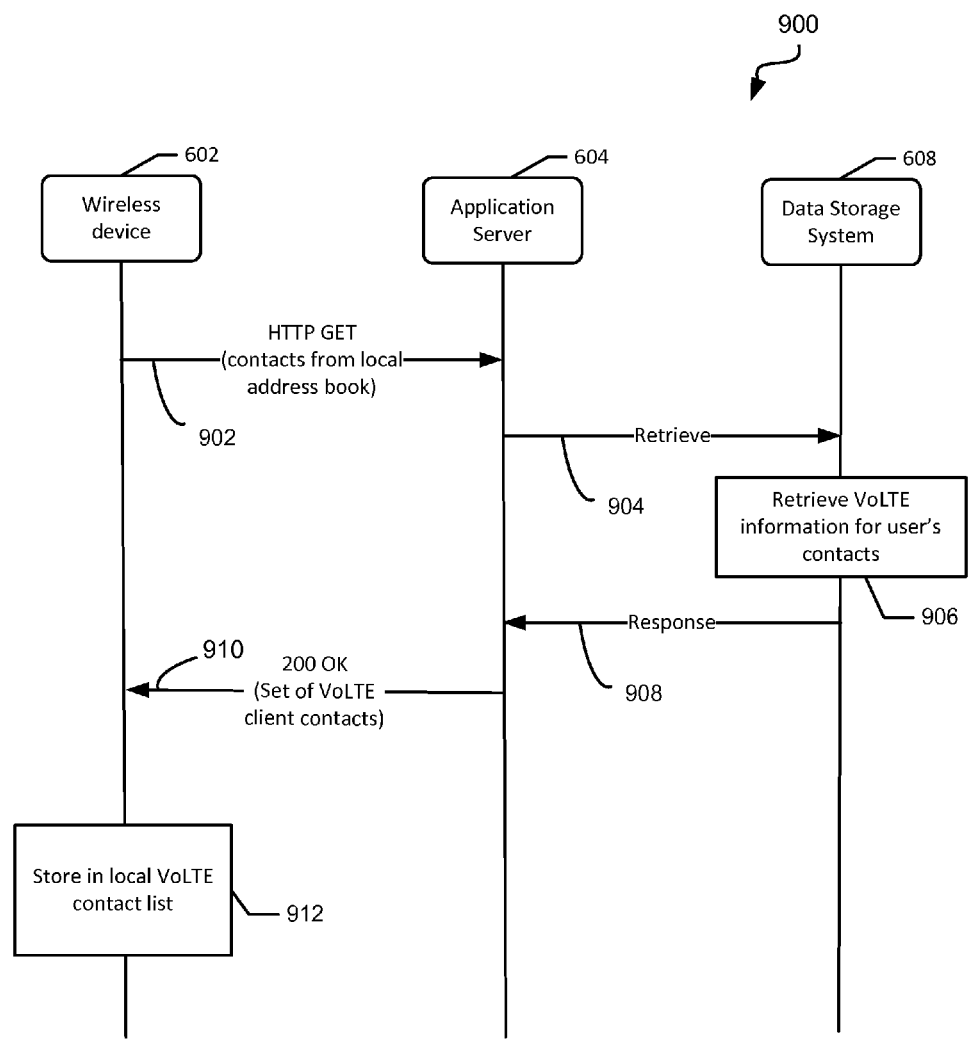
FIG. 9A is a message flow diagram illustrating example interactions between a wireless mobile device and a VoLTE network to create a local VoLTE contact list.

Thus, because a significant number of the mobile device's mobile originating calls may be to target mobile devices associated with the user's contacts, or to target mobile devices that were previously engaged in a voice call with the wireless mobile device, a connection to the VoLTE network mobile device may be avoided for many target mobile devices. FIG. 9A illustrates example message flows for generating a local VoLTE contact list on a wireless mobile device, used in block 804 of method 800 discussed above with reference to FIG. 8. The local VoLTE contact list may be a list identifying which of the user's contacts has a VoLTE-capable mobile device. In another embodiment, the local VoLTE contact list may be integrated with existing contact information stored on the mobile device, and may provide a field for each entry that states whether VoLTE capability exists.

In message flow 900, the Friend Finder application may transmit mobile device numbers (MDNs), or other identifying information, of user's contacts to the VoLTE application server in message 902. The user's contacts may be obtained from the mobile device memory, such as data records associated with an address book application. The message 902 may include a request to obtain VoLTE information corresponding to the MDNs of the user's contacts, which may be sent as a HTTP GET method. The VoLTE application server 500 may transmit a retrieve message 904 to a data storage system in which records for registered VoLTE-capable mobile devices may be stored. The data storage system may retrieve the stored VoLTE-capability information, if any, for each contact MDN, in block 906. That is, for each contact associated with a VoLTE-capable mobile device, the VoLTE information corresponding to that contact telephone number may be retrieved. For each contact that is not associated with a VoLTE-capable mobile device no information will be retrieve, since no VoLTE information would have been stored.

The data storage system may send the retrieved VoLTE capability information in a response message 908 to the VoLTE application server. The VoLTE application server may transmit the VoLTE capability information to the mobile device, such as in an HTTP request response OK such as 200, message 910. The received VoLTE capability information, which identifies the MDNs of the user's contacts, are VoLTE-capable mobile devices. The set of VoLTE-capable contacts may be automatically updated in periodic intervals, and the set of VoLTE-capable mobile devices from previous VoLTE calls may be developed as such calls take place.

Figure 9B:
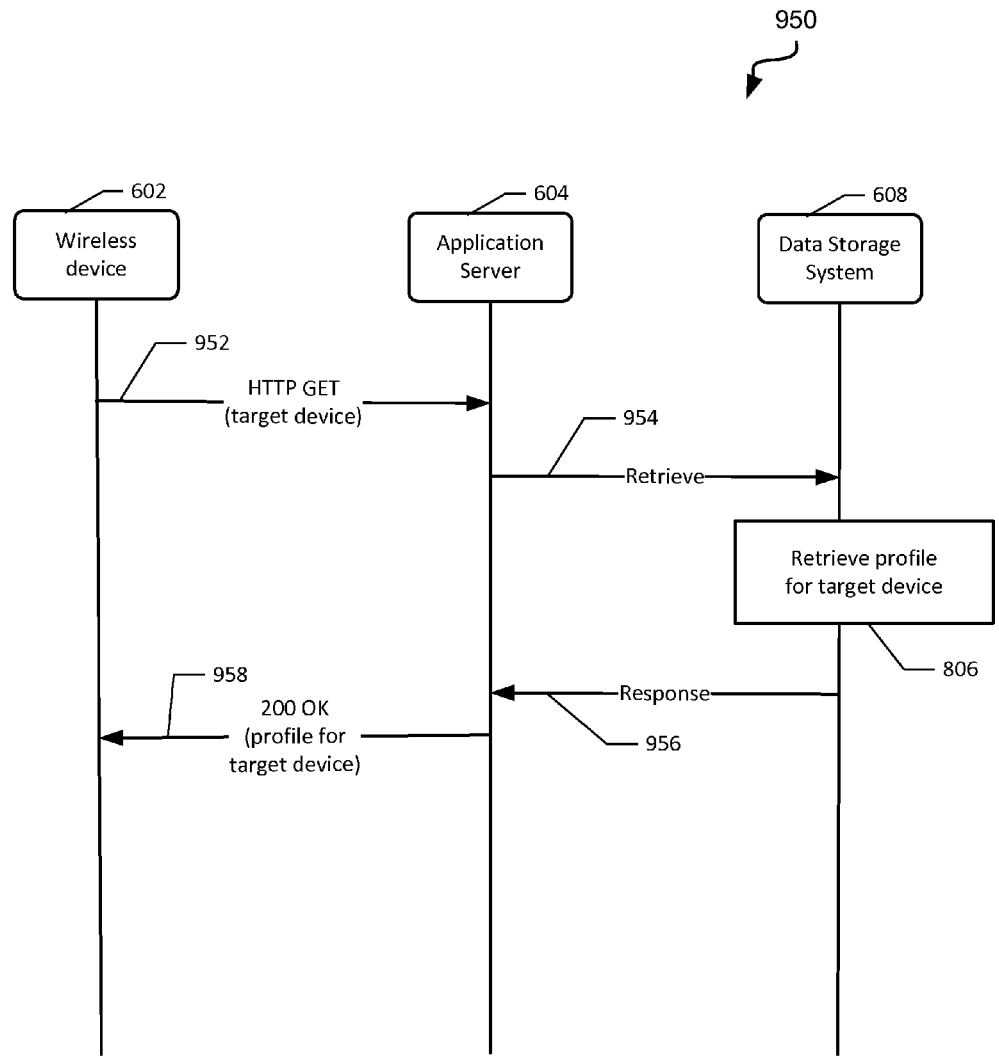
FIG. 9B is a message flow diagram illustrating example interactions between a wireless mobile device and a VoLTE network to retrieve VoLTE capability information for a target mobile device.

FIG. 9B is a message flow diagram 950 showing example interactions for retrieving VoLTE capability information for a single target mobile device, such as in block 814 of method 800 in FIG. 8. The Friend Finder application may send to the VoLTE server the MDN or other identifying information for the target mobile device, message 952. The message 952 may include a request to obtain VoLTE information corresponding to the MDN of the target mobile device, which may be sent as a HTTP GET method. The VoLTE application server 500 may transmit a retrieve message 954 to a data storage system. The data storage system may retrieve the stored VoLTE-capability information, if any, for the target mobile device, block 956. The data storage system may send the retrieved VoLTE capability information in a response message 958 to the VoLTE application server. The VoLTE application server may transmit the VoLTE capability information to the wireless mobile device, for example, in a HTTP request response such as 200 OK, message 990.

Figure 10:
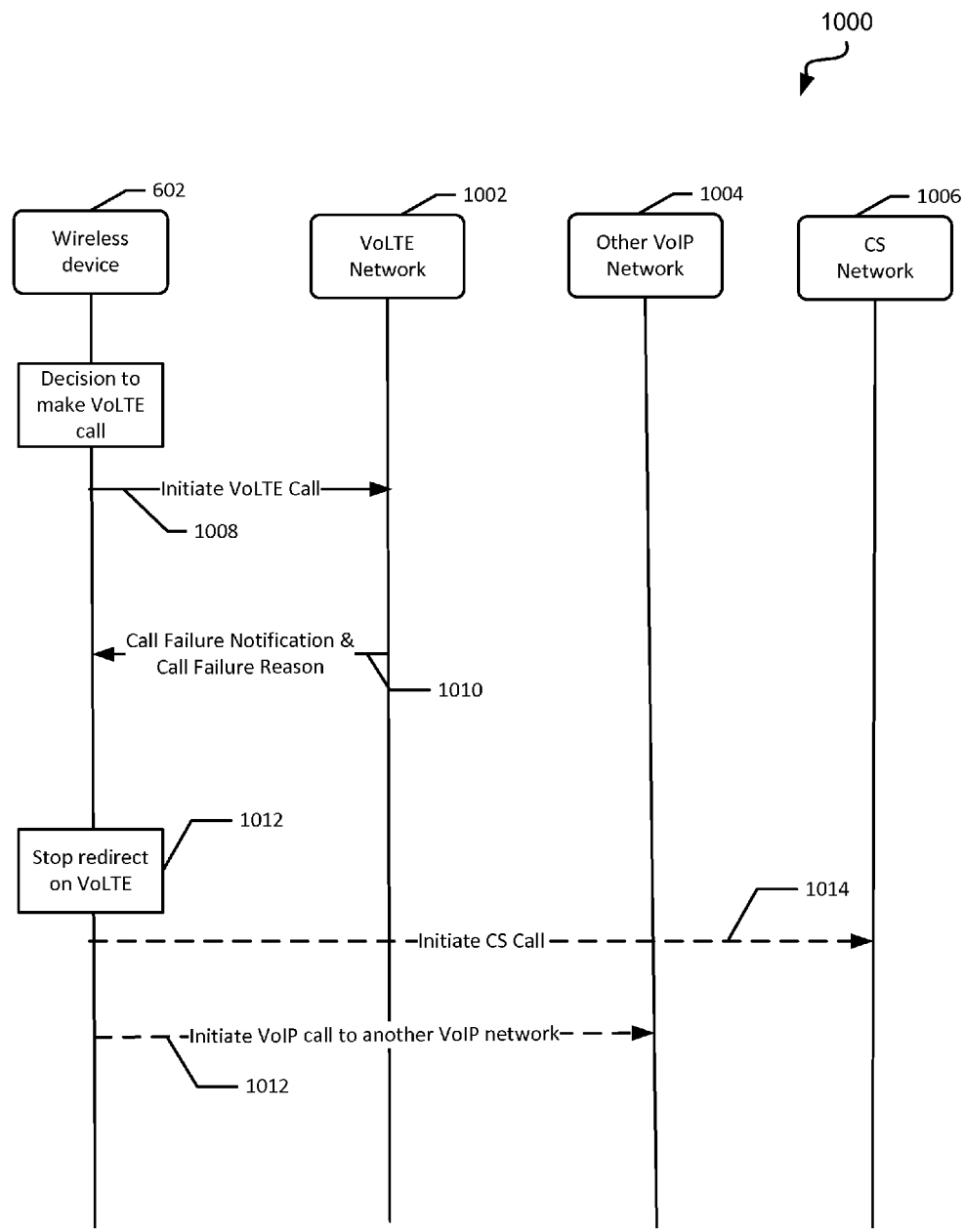
FIG. 10 is a message flow diagram illustrating example interactions between a VoLTE-capable mobile device and voice service networks to handle an unsuccessful VoLTE voice call initiation.

FIG. 10 is a message flow diagram 1000 illustrating example interactions among a VoLTE-capable mobile device and wireless communication networks for handling a failed mobile originating call according to an embodiment. A VoLTE-capable mobile device may place a voice call to a target mobile device over a VoLTE network, for example, by performing the operations in blocks 702-710 described above with reference to FIG. 7. The mobile device may initiate a voice call to the target mobile device on a VoLTE network in message 1008. If the call is not successfully established on the VoLTE network, the mobile device may receive a call failure notification from the VoLTE network in message 1010.

Message 1010 may also include a call failure reason that provides information to the mobile device regarding why the attempted VoLTE call failed. For example, the target mobile device may be out of VoLTE service range (i.e., out of range of eNodeBs), out of all network reception ranges (e.g., in subway/metro), turned off, not answered by a user or voicemail system, etc. In response, the mobile device may take an action to re-attempt a voice call with the target mobile device, with the type of call attempt based on the received reason for the initial call failure. In an embodiment, the mobile device may stop further automatic reconnection attempts on the VoLTE network in block 1012, and may instead re-initiate the voice call on a different network. For example, depending on the call failure reason and the available networks to the mobile device, the mobile device may attempt to re-initiate the voice call on another VoIP network in optional message 1014. Alternatively, the mobile device may attempt to re-initiate the voice call on a CS network in optional message 1016.

Given the various standards and the nature of the technology the existence of CS network capability may be presumed to exist in all VoLTE target mobile devices. Therefore, in an embodiment the voice call may be automatically re-initiated on a CS network in response to receiving a call failure notification from an attempted VoLTE call, with second call attempt occurring without requiring user intervention. In another embodiment, the voice call may be automatically re-initiated on one of a plurality of non-VoLTE networks according to a user's preset network preferences.

In summary, the various embodiments include a VoLTE application that may be implemented on a mobile device to select the appropriate radio access technology (i.e., a VoLTE or CS network) for placing a telephone call to a particular target mobile device. Such an application may run in the background of a VoLTE mobile device, with operations that appear seamless to the user. Performing the selection of radio technology for a call on mobile device (i.e., on the client side) avoids the need for re-configuring existing CS and/or VoLTE networks, while enabling rapid call connections.

Figure 11:
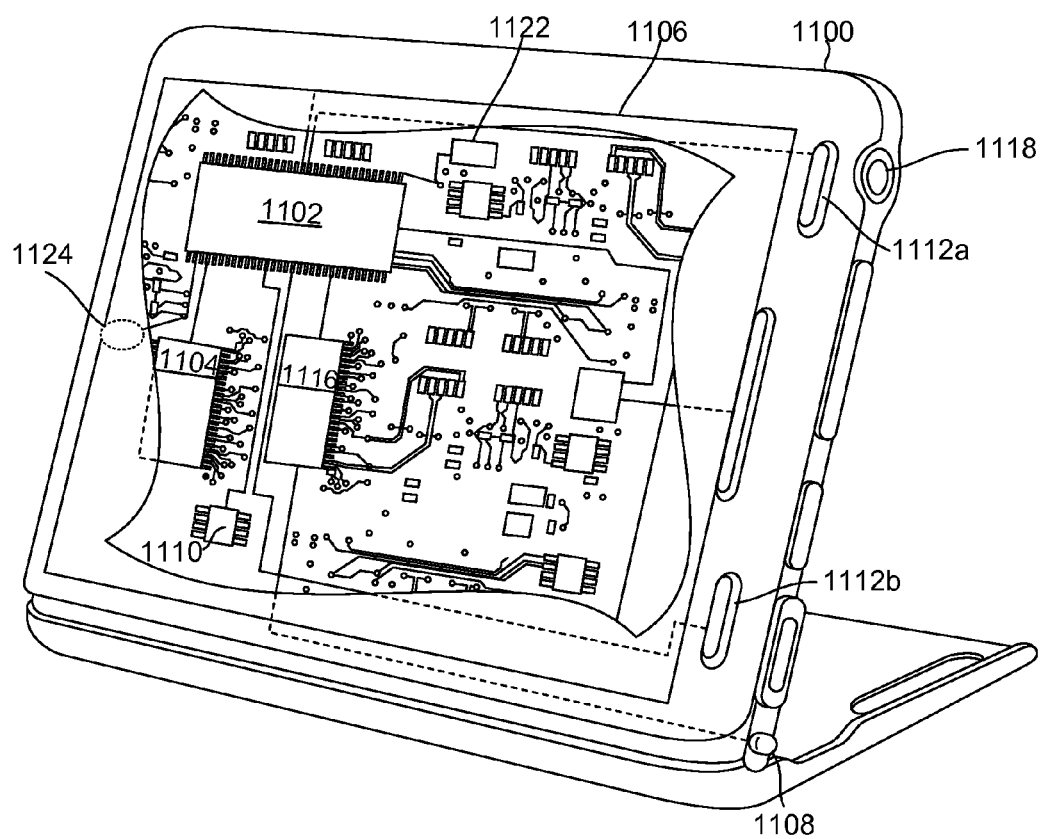
FIG. 11 is a component block diagram of a mobile device suitable for use in an embodiment.

The various embodiments may be implemented in any of a variety of wireless VoLTE-capable mobile devices, an example of which is illustrated in FIG. 11. For example, the mobile device 1100 may include a processor 1102 coupled to internal memories 1104 and 1110. Internal memories 1104 and 1110 may be volatile or non-volatile memories, and may also be secure and/or encrypted memories, or unsecure and/or unencrypted memories, or any combination thereof. The processor 1102 may also be coupled to a touch screen display 1106, such as a resistive-sensing touch screen, capacitive-sensing touch screen infrared sensing touch screen, or the like, although the mobile device need not have touch screen capability. Additionally, the mobile device 1100 may have one or more antenna 1108 for sending and receiving electromagnetic radiation connected to one or more wireless data link and/or cellular telephone transceivers 1116 coupled to the processor 1102. The cellular telephone transceivers 1116 may be configured to communicate via a VoLTE technology network as well as a conventional CS network. The wireless mobile device 1100 may also include physical buttons 1112a and 1112b for receiving user inputs, and a power button 1118 for turning the wireless mobile device 1100 on and off. The wireless mobile device 1100 may also include a position sensor 1122, such as a GPS receiver, coupled to the processor 1102. The wireless mobile device 1100 may also include a camera 1124 coupled to the processor 1102.

Figure 12:
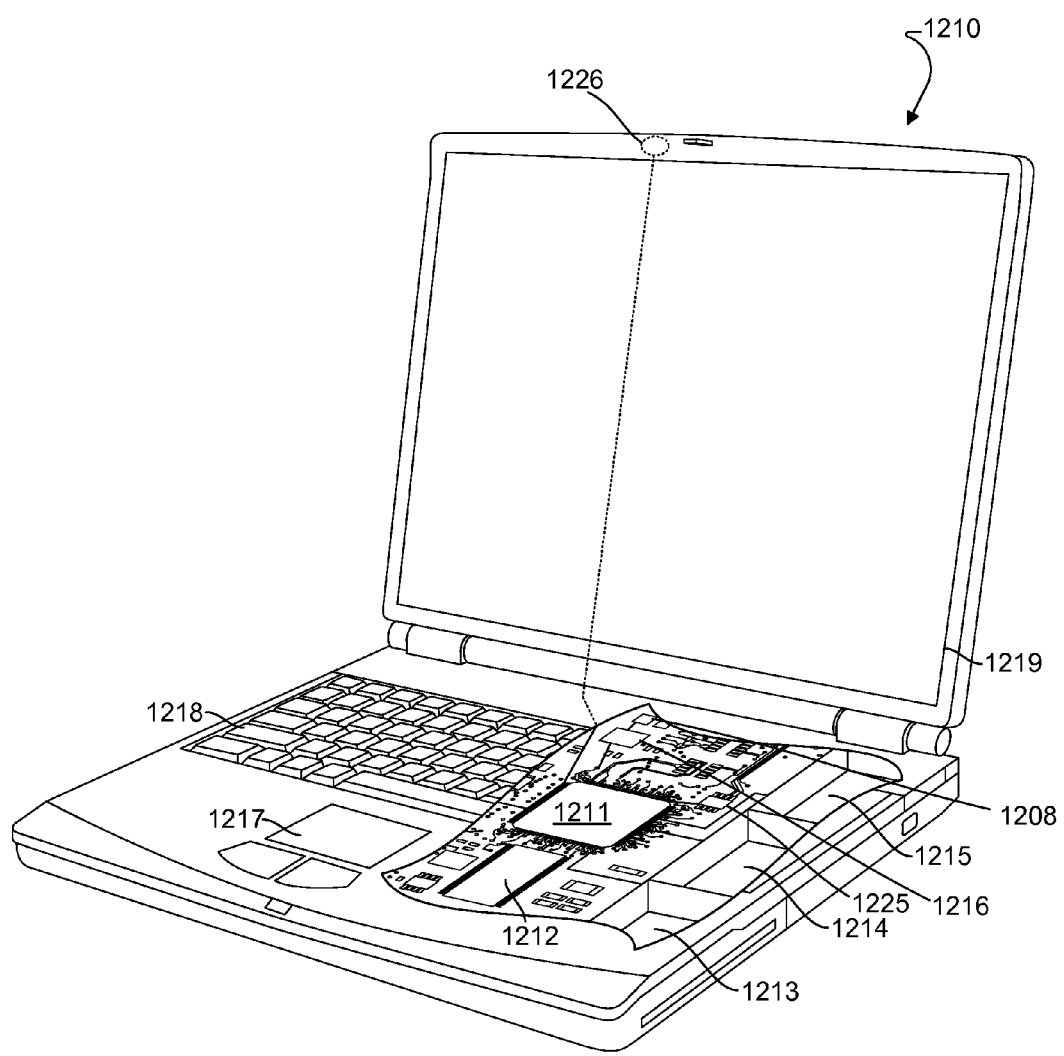
FIG. 12 is a component block diagram of a server mobile device suitable for use in an embodiment.

The various embodiments described above may also be implemented within a variety of personal computing mobile devices configured with cellular network transceivers, such as a laptop computer 1210 as illustrated in FIG. 12. Many laptop computers include a touch pad touch surface 1217 that serves as the computer's pointing mobile device, and thus may receive drag, scroll, and flick gestures similar to those implemented on mobile computing mobile devices equipped with a touch screen display and described above. A laptop computer 1210 will typically include a processor 1211 coupled to volatile memory 1212 and a large capacity nonvolatile memory, such as a disk drive 1213 of Flash memory. The laptop computer 1210 may also include a floppy disc drive 1214 and a compact disc (CD) drive 1215 coupled to the processor 1211. The laptop computer 1210 may also include a number of connector ports coupled to the processor 1211 for establishing data connections or receiving external memory mobile devices, such as a USB or FireWire® connector sockets, or other network connection circuits for coupling the processor 1211 to a network. In a notebook configuration, the computer housing includes the touchpad 1217, the keyboard 1218, and the display 1219 all coupled to the processor 1211. The laptop computer 1210 may also include a position sensor 1225, such as a GPS receiver, coupled to the processor 1211. Additionally, the laptop computer 1210 may have one or more antenna 1208 for sending and receiving electromagnetic radiation that may be connected to one or more a wireless data link and/or cellular telephone transceivers 1216 coupled to the processor 1211. The cellular telephone transceivers 1116 may be configured to communicate via a VoLTE technology network as well as a conventional CS network. The laptop computer 1210 may also include a camera 1226 coupled to the processor 1211. Other configurations of the computing mobile device may include a computer mouse or trackball coupled to the processor (e.g., via a USB input) as are well known, which may also be used in conjunction with the various embodiments.

Figure 13:
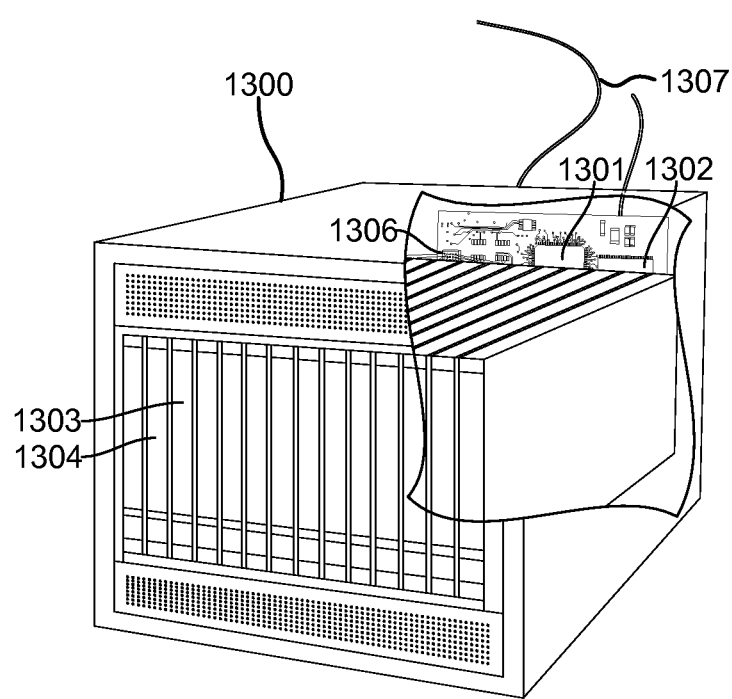
FIG. 13 is a component block diagram of a laptop computer mobile device suitable for use in an embodiment.

The various embodiments may also be implemented on any of a variety of commercially available server mobile devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1304 coupled to the processor 1301. The server 1300 may also include network access ports 1306 coupled to the processor 1301 for establishing network interface connections with a network 1307, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 1102, 1211, and 1301 may be any programmable microprocessor, microcomputer or multiple processor chip or chips that can be configured by software instructions (applications) to perform a variety of functions, including the functions of the various embodiments described above. In some mobile devices, multiple processors may be provided, such as one processor dedicated to wireless communication functions and one processor dedicated to running other applications. Typically, software applications may be stored in the internal memory 1104, 1110, 1212, 1213, 1302, and 1303 before they are accessed and loaded into the processors 1102, 1211, and 1301. The processors 1102, 1211, and 1301 may include internal memory sufficient to store the application software instructions. In many mobile devices the internal memory may be a volatile or nonvolatile memory, such as flash memory, or a mixture of both. For the purposes of this description, a general reference to memory refers to memory accessible by the processors 1102, 1211, and 1301 including internal memory or removable memory plugged into the mobile device and memory within the processor 1102, 1211, and 1301 themselves.

As mentioned above, the references to VoLTE-capable mobile devices and VoLTE networks in the foregoing descriptions of the embodiments are for illustrative purposes and are not intended to limit the scope of the claims to VoLTE technologies. The various embodiments are generally applicable to any VoIP-capable mobile device and VoIP network, and the forgoing references to VoLTE is not intended to limit the scope of the claims unless VoLTE technology is expressly recited in the claims.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic mobile device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing mobile devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

The functions of the various embodiments described above may be implemented in hardware, software, firmware, or any combination thereof. If implemented in software, the functions may be stored as one or more instructions or code on a non-transitory computer-readable medium. The operations of a method or algorithm disclosed herein may be embodied in a processor-executable software module, which may reside on a non-transitory computer-readable storage medium. Non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage mobile devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for selecting a network for originating voice call on a voice over IP (VoIP)-capable mobile device, comprising:
    receiving an input to initiate a voice call to a target mobile device;
    determining on the VoIP-capable mobile device whether the target mobile device is capable of receiving a voice call on a VoIP network based on whether a user profile for the target mobile device is registered with an application server associated with the VoIP network;
    determining on the VoIP-capable mobile device whether the target mobile device is available to communicate on the VoIP network in response to determining that the target mobile device is capable of receiving a voice call on the VoIP network; and
    initiating the voice call on a circuit switched (CS) network in response to determining that the target mobile device is not available to communicate on the VoIP network.

2. The method of claim 1, further comprising:
    downloading user profile information from the application server associated with the VoIP network; and
    storing the downloaded user profile information in a memory on the VoIP-capable mobile device, wherein determining whether the target mobile device is capable of receiving a voice call on a VoIP network is accomplished using the stored user profile information.

3. The method of claim 1, wherein determining on the VoIP-capable mobile device whether the target mobile device is available to communicate on the VoIP network comprises determining whether the target mobile device is registered with a VoIP network server.

4. The method of claim 1, further comprising initiating the voice call on the VoIP network in response to determining that the target mobile device is capable of receiving a voice call on the VoIP network and that the target mobile device is available to communicate on the VoIP network.

5. The method of claim 4, further comprising:
    determining whether the initiated voice call was established on the VoIP network; and
    storing on the VoIP-capable mobile device a record of a successful call to the target mobile device in response to determining that the initiated voice call was established on the VoIP network, wherein the record comprises a mobile device number (MDN) of the target mobile device and an identification of the VoIP network.

6. The method of claim 5, further comprising initiating the voice call on a circuit switched network in response to determining that the voice call was not established on the VoIP network.

7. The method of claim 5, further comprising:
    determining whether a call failure reason has been received from the VoIP network in response to determining that the voice call was not established on the VoIP network; and
    selecting a circuit switched network for initiating the voice call based at least in part on information in the call failure reason in response to determining that a call failure reason has been received from the VoIP network.

8. The method of claim 1, wherein:
    the VoIP-capable mobile device is a voice over LTE (VoLTE)-capable mobile device; and
    determining on the VoIP-capable mobile device whether the target mobile device is capable of receiving a voice call on a VoIP network comprises determining whether the target mobile device is capable of receiving a voice call on a VoLTE network.

9. The method of claim 8, further comprising:
    creating a local VoLTE contact list;
    wherein determining whether the target mobile device is capable of receiving a voice call on a VoLTE network comprises:
        determining whether a mobile device number (MDN) of the target mobile device is saved as a user contact on the VoIP-capable mobile device; and
        determining whether the MDN of the target mobile device matches an MDN stored in the local VoLTE contact list in response to determining that the MDN of the target mobile device is saved as a user contact on the VoIP-capable mobile device.

10. The method of claim 9, wherein creating the local VoLTE contact list comprises:
    sending to the VoLTE network user contact MDNs that are saved on the VoIP-capable mobile device;
    requesting from the VoLTE network profile information associated with each user contact MDN;
    receiving from the VoLTE network profile information associated with each user contact MDN, wherein the received profile information for user contact MDNs that are not VoLTE contain no data; and
    storing on the VoIP-capable mobile device a list of user contact MDNs for which the received profile information contains data.

11. The method of claim 9, wherein:
    determining whether the target mobile device is capable of receiving a voice call on the VoLTE network further comprises:
        accessing stored voice call records that identify the VoLTE network in response to determining that the MDN of the target mobile device is not saved as a user contact on the mobile device; and
        determining whether the MDN of the target mobile device is saved in a stored voice call record identified by the VoLTE network.

12. The method of claim 11, wherein determining on the VoIP-capable mobile device whether the target mobile device is capable of receiving a voice call on the VoLTE network further comprises:
> starting a VoLTE application on the mobile device in response to determining that the MDN of the target mobile device is not saved in a stored voice call record identified by the VoLTE;
> sending the MDN of the target mobile device to a VoLTE application server, wherein the VoLTE application server is coupled to a data storage system, wherein the data storage system contains VoLTE registration information for a plurality of mobile devices on the VoLTE network;
> requesting VoLTE registration information associated with the MDN of the target mobile device; and
> determining whether information associated with the MDN of the target mobile device was received from the VoLTE application server.

13. The method of claim 12, further comprising initiating the voice call on the VoLTE network in response to determining that information associated with the MDN of the target mobile was received from the VoLTE application server.

14. The method of claim 12, further comprising initiating the voice call on the circuit switched network in response to determining that no information associated with the MDN of the target mobile device was received from the VoLTE application server.

15. A voice over IP (VoIP)-capable mobile device, comprising:
> a memory;
> a user interface;
> a transceiver;
> a network interface; and
> a processor coupled to the memory, the user interface, the transceiver, and the network interface, wherein the processor is configured with processor-executable instructions to perform operations comprising:
>> receiving input via the user interface to initiate a voice call to a target mobile device;
>> determining whether the target mobile device is capable of receiving a voice call on a VoIP network based on whether a user profile for the target mobile device is registered with an application server associated with the VoIP network;
>> determining whether the target mobile device is available to communicate on the VoIP network in response to determining that the target mobile device is capable of receiving a voice call on the VoIP network; and
>> initiating the voice call on a circuit switched network in response to determining that the target mobile device is not available to communicate on the VoIP network.

16. The VoIP-capable mobile device of claim 15, wherein the processor is configured with processor-executable instructions to perform operations further comprising:
> downloading user profile information from the application server associated with the VoIP network; and
> storing to the memory the downloaded user profile information, wherein determining whether the target mobile device is capable of receiving a voice call on a VoIP network is accomplished using the stored user profile information.

17. The VoIP-capable mobile device of claim 15, wherein the processor is configured with processor-executable instructions to perform operations such that determining whether the target mobile device is available to communicate on the VoIP network comprises determining whether the target mobile device is registered with a VoIP network server.

18. The VoIP-capable mobile device of claim 15, wherein the processor is configured with processor-executable instructions to perform operations further comprising initiating the voice call on the VoIP network in response to determining that the target mobile device is capable of receiving a voice call on the VoIP network and that the target mobile device is available to communicate on the VoIP network.

19. The VoIP-capable mobile device of claim 18, wherein the processor is configured with processor-executable instructions to perform operations further comprising:
> determining whether the initiated voice call was established on the VoIP network; and
> storing in the memory a record of a successful call to the target mobile device in response to determining that the initiated voice call was established on the VoIP network, wherein the record comprises a mobile device number (MDN) of the target mobile device and an identification of the VoIP network.

20. The VoIP-capable mobile device of claim 19, wherein the processor is configured with processor-executable instructions to perform operations further comprising initiating the voice call on a circuit switched network in response to determining that the voice call was not established on the VoIP network.

21. The VoIP-capable mobile device of claim 19, wherein the processor is configured with processor-executable instructions to perform operations further comprising:
> determining whether a call failure reason has been received from the VoIP network in response to determining that the voice call was not established on the VoIP network; and
> selecting a circuit switched network for initiating the voice call based at least in part on information in the call failure reason in response to determining that a call failure reason has been received from the VoIP network.

22. The VoIP-capable mobile device of claim 15, wherein the mobile device is a voice over LTE (VoLTE)-capable mobile device; and
> the processor is configured with processor-executable instructions to perform operations such that determining whether the target mobile device is capable of receiving a voice call on a VoIP network comprises determining whether the target mobile device is capable of receiving a voice call on a VoLTE network.

23. The VoIP-capable mobile device of claim 22, wherein:
> the processor is configured with processor-executable instructions to perform operations further comprising creating a local VoLTE contact list; and
> the processor is configured with processor-executable instructions to perform operations such that determining whether the target mobile device is capable of receiving a voice call on a VoLTE network comprises:
>> determining whether a mobile device number (MDN) of the target mobile device is saved as a user contact in the memory; and
>> determining whether the MDN of the target mobile device matches an MDN stored in the local VoLTE contact list in response to determining that the MDN of the target mobile device is saved as a user contact in the memory.

24. The VoIP-capable mobile device of claim 23, wherein the processor is configured with processor-executable instructions to perform operations such that the local VoLTE contact list comprises:

sending to the VoLTE network user contact MDNs that are saved on the VoIP-capable mobile device;
requesting from the VoLTE network profile information associated with each user contact MDN;
receiving from the VoLTE network profile information associated with each user contact MDN, wherein the received profile information for user contact MDNs that are not VoLTE contain no data; and
storing on the VoIP-capable mobile device a list of user contact MDNs for which the received profile information contains data.

25. The VoIP-capable mobile device of claim 23, wherein the processor is configured with processor-executable instructions to perform operations such that:
accessing stored voice call records that identify the VoLTE network in response to determining that the MDN of the target mobile device is not saved as a user contact saved in the memory; and
determining whether the target mobile device MDN is saved in a stored voice call record identified by the VoLTE network.

26. The VoIP-capable mobile device of claim 25, wherein the processor is configured with processor-executable instructions to perform operations such that determining whether the target mobile device is capable of receiving a voice call on a VoLTE network further comprises:
starting a VoLTE application on the mobile device in response to determining that the MDN of the target mobile device is not saved in a stored voice call record identified by the VoLTE network;
sending the MDN of the target mobile device to a VoLTE application server, wherein the VoLTE application server is coupled to a data storage system, wherein the data storage system contains VoLTE registration information for a plurality of mobile devices on the VoLTE network;
requesting VoLTE registration information associated with the MDN of the target mobile device; and
determining whether information associated with the MDN of the target mobile device was received from the VoLTE application server.

27. The VoIP-capable mobile device of claim 26, wherein the processor is configured with processor-executable instructions to perform operations further comprising initiating the voice call on the VoLTE network in response to determining that information associated with the MDN of the target mobile device was received from the VoLTE application server.

28. The VoIP-capable mobile device of claim 26, wherein the processor is configured with processor-executable instructions to perform operations further comprising initiating the voice call on the circuit switched network in response to determining that no information associated with the MDN of the target mobile device was received from the VoLTE application server.

29. A mobile device, comprising:
means for receiving an input to initiate a voice call to a target mobile device;
means for determining whether the target mobile device is capable of receiving a voice call on a voice over IP (VoIP) network based on whether a user profile for the target mobile device is registered with an application server associated with the VoIP network;
means for determining whether the target mobile device is available to communicate on the VoIP network in response to determining that the target mobile device is capable of receiving a voice call on the VoIP network; and
means for initiating the voice call on a circuit switched network in response to determining that the target mobile device is not capable of receiving a voice call on the VoIP network.

30. The mobile device of claim 29, further comprising:
means for downloading user profile information from the application server associated with the VoIP network; and
means for storing the downloaded user profile information in memory on the mobile device, wherein means for determining whether the target mobile device is capable of receiving a voice call on a VoIP network comprises means for determining whether the target mobile device is capable of receiving a voice call on a VoIP network using the stored user profile information.

31. The mobile device of claim 29, wherein means for determining whether the target mobile device is available to communicate on the VoIP network comprises means for determining whether the target mobile device is registered with a VoIP network server.

32. The mobile device of claim 29, further comprising means for initiating the voice call on the VoIP network in response to determining that the target mobile device is capable of receiving a voice call on the VoIP network and that the target mobile device is available to communicate on the VoIP network.

33. The mobile device of claim 32, further comprising:
means for determining whether the initiated voice call was established on the VoIP network; and
means for storing a record of a successful call to the target mobile device in response to determining that the initiated voice call was established on the VoIP network, wherein the record comprises a mobile device number (MDN) of the target mobile device and an identification of the VoIP network.

34. The mobile device of claim 33, further comprising means for initiating the voice call on a circuit switched network in response to determining that the voice call was not established on the VoIP network.

35. The mobile device of claim 33, further comprising:
means for determining whether a call failure reason has been received from the VoIP network in response to determining that the voice call was not established on the VoIP network; and
means for selecting a circuit switched network for initiating the voice call based at least in part on information in the call failure reason in response to determining that a call failure reason has been received from the VoIP network.

36. The mobile device of claim 29, wherein:
the mobile device is a voice over LTE (VoLTE)-capable mobile device; and
means for determining whether the target mobile device is capable of receiving a voice call on a VoIP network comprises means for determining whether the target mobile device is capable of receiving a voice call on a VoLTE network.

37. The mobile device of claim 36, further comprising:
means for creating a local VoLTE contact list;
wherein means for determining whether the target mobile device is capable of receiving a voice call on a VoLTE network comprises:
means for determining whether a mobile device number (MDN) of the target mobile device is saved as a user contact on the mobile device; and means for determining whether the MDN of the target mobile device matches an MDN stored in the local VoLTE contact list in response to determining that the MDN of the target mobile device is saved as a user contact on the mobile device.

38. The mobile device of claim 37, wherein means for creating the local VoLTE contact list comprises:
means for sending to the VoLTE network user contact MDNs that are saved on the mobile device;
means for requesting from the VoLTE network profile information associated with each user contact MDN;
means for receiving from the VoLTE network profile information associated with each user contact MDN, wherein the received profile information for user contact MDNs that are not VoLTE contain no data; and
means for storing on the mobile device a list of user contact MDNs for which the received profile information contains data.

39. The mobile device of claim 37, wherein:
means for determining whether the target mobile device is capable of receiving a voice call on the VoLTE network further comprises:
means for accessing stored voice call records that identify the VoLTE network in response to determining that the MDN of the target mobile device is not saved as a user contact on the mobile device; and
means for determining whether the MDN of the target mobile device is saved in a stored voice call record identified by the VoLTE network.

40. The mobile device of claim 39, wherein means for determining whether the target mobile device is capable of receiving a voice call on the VoLTE network further comprises:
means for starting a VoLTE application on the mobile device in response to determining that the MDN of the target mobile device is not saved in a stored voice call record identified by the VoLTE;
means for sending the MDN of the target mobile device to a VoLTE application server, wherein the VoLTE application server is coupled to a data storage system, wherein the data storage system contains VoLTE registration information for a plurality of mobile devices on the VoLTE network;
means for requesting VoLTE registration information associated with the MDN of the target mobile; and
means for determining whether information associated with the MDN of the target mobile device was received from the VoLTE application server.

41. The mobile device of claim 40, further comprising means for initiating the voice call on the VoLTE network in response to determining that information associated with the MDN of the target mobile was received from the VoLTE application server.

42. The mobile device of claim 40, further comprising means for initiating the voice call on the circuit switched network in response to determining that no information associated with the MDN of the target mobile device was received from the VoLTE application server.

43. A non-transitory processor-readable storage medium having stored thereon processor-executable instructions configured to cause a mobile device processor to perform operations comprising:
receiving an input to initiate a voice call to a target mobile device;
determining whether the target mobile device is capable of receiving a voice call on a VoIP network based on whether a user profile for the target mobile device is registered with an application server associated with the VoIP network;
determining whether the target mobile device is available to communicate on the VoIP network in response to determining that the target mobile device is capable of receiving a voice call on the VoIP network; and
initiating the voice call on a circuit switched network in response to determining that the target mobile device is not capable of receiving a voice call on the VoIP network.

44. The non-transitory processor-readable storage medium of claim 43, wherein the stored processor-executable instructions are configured to cause the mobile device processor to perform operations further comprising:
downloading user profile information from the application server associated with the VoIP network; and
storing the downloaded user profile information in memory on the mobile device, wherein determining whether the target mobile device is capable of receiving a voice call on a VoIP network is accomplished using the stored user profile information.

45. The non-transitory processor-readable storage medium of claim 43, wherein the stored processor-executable instructions are configured to cause the mobile device processor to perform operations such that determining whether the target mobile device is available to communicate on the VoIP network comprises determining whether the target mobile device is registered with a VoIP network server.

46. The non-transitory processor-readable storage medium of claim 43, wherein the stored processor-executable instructions are configured to cause the mobile device processor to perform operations further comprising initiating the voice call on the VoIP network in response to determining that the target mobile device is capable of receiving a voice call on the VoIP network and that the target mobile device is available to communicate on the VoIP network.

47. The non-transitory processor-readable storage medium of claim 46, wherein the stored processor-executable instructions are configured to cause the mobile device processor to perform operations further comprising:
determining whether the initiated voice call was established on the VoIP network; and
storing on the mobile device a record of a successful call to the target mobile device in response to determining that the initiated voice call was established on the VoIP network, wherein the record comprises a mobile device number (MDN) of the target mobile device and an identification of the VoIP network.

48. The non-transitory processor-readable storage medium of claim 47, wherein the stored processor-executable instructions are configured to cause the mobile device processor to perform operations further comprising initiating the voice call on a circuit switched network in response to determining that the voice call was not established on the VoIP network.

49. The non-transitory processor-readable storage medium of claim 47, wherein the stored processor-executable instructions are configured to cause the mobile device processor to perform operations further comprising:
determining whether a call failure reason has been received from the VoIP network in response to determining that the voice call was not established on the VoIP network; and
selecting a circuit switched network for initiating the voice call based at least in part on information in the call failure reason in response to determining that a call failure reason has been received from the VoIP network.

50. The non-transitory processor-readable storage medium of claim 43, wherein:
  the mobile device is a VoLTE-capable mobile device; and
  the stored processor-executable instructions are configured to cause the mobile device processor to perform operations such that determining whether the target mobile device is capable of receiving a voice call on a VoIP network comprises determining whether the target mobile device is capable of receiving a voice call on a VoLTE network.

51. The non-transitory processor-readable storage medium of claim 50, wherein the stored processor-executable instructions are configured to cause the mobile device processor to perform operations further comprising:
  creating a local VoLTE contact list;
  wherein the stored processor-executable instructions are configured to cause the mobile device processor to perform operations such that determining whether the target mobile device is capable of receiving a voice call on a VoLTE network comprises:
    determining whether a mobile device number (MDN) of the target mobile device is saved as a user contact on the mobile device; and
    determining whether the MDN of the target mobile device matches an MDN stored in the local VoLTE contact list in response to determining that the MDN of the target mobile device is saved as a user contact on the mobile device.

52. The non-transitory processor-readable storage medium of claim 51, wherein the stored processor-executable instructions are configured to cause the mobile device processor to perform operations such that creating the local VoLTE contact list comprises:
  sending to the VoLTE network user contact MDNs that are saved on the mobile device;
  requesting from the VoLTE network profile information associated with each user contact MDN;
  receiving from the VoLTE network profile information associated with each user contact MDN, wherein the received profile information for user contact MDNs that are not VoLTE contain no data; and
  storing on the mobile device a list of user contact MDNs for which the received profile information contains data.

53. The non-transitory processor-readable storage medium of claim 51, wherein the stored processor-executable instructions are configured to cause the mobile device processor to perform operations such that determining whether the target mobile device is capable of receiving a voice call on the VoLTE network further comprises:
  accessing stored voice call records that identify the VoLTE network in response to determining that the MDN of the target mobile device is not saved as a user contact on the mobile device; and
  determining whether the MDN of the target mobile device is saved in a stored voice call record identified by the VoLTE network.

54. The non-transitory processor-readable storage medium of claim 53, wherein the stored processor-executable instructions are configured to cause the mobile device processor to perform operations such that determining whether the target mobile device is capable of receiving a voice call on the VoLTE network further comprises:
  starting a VoLTE application on the mobile device in response to determining that the MDN of the target mobile device is not saved in a stored voice call record identified by the VoLTE application;
  sending the MDN of the target mobile device to a VoLTE application server, wherein the VoLTE application server is coupled to a data storage system, wherein the data storage system contains VoLTE registration information for a plurality of mobile devices on the VoLTE network;
  requesting VoLTE registration information associated with the MDN of the target mobile; and
  determining whether information associated with the MDN of the target mobile device was received from the VoLTE application server.

55. The non-transitory processor-readable storage medium of claim 54, wherein the stored processor-executable instructions are configured to cause the mobile device processor to perform operations further comprising initiating the voice call on the VoLTE network in response to determining that information associated with the MDN of the target mobile device was received from the VoLTE application server.

56. The non-transitory processor-readable storage medium of claim 54, wherein the stored processor-executable instructions are configured to cause the mobile device processor to perform operations further comprising initiating the voice call on the circuit switched network in response to determining that no information associated with the MDN of the target mobile device was received from the VoLTE application server.

* * * * *